Dec. 8, 1936.      S. G. STUCKEY      2,063,565
GLASS FEEDER FOR SUCTION MOLDS
Filed Dec. 6, 1929      2 Sheets-Sheet 1
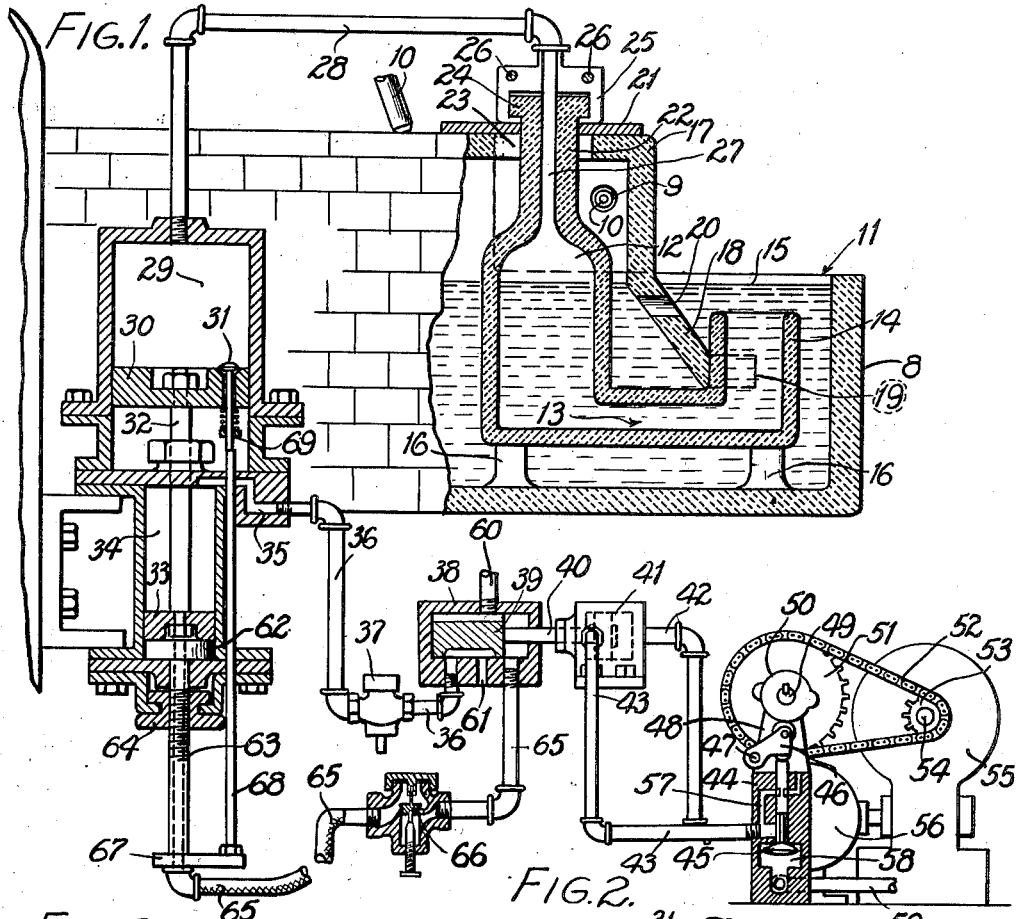
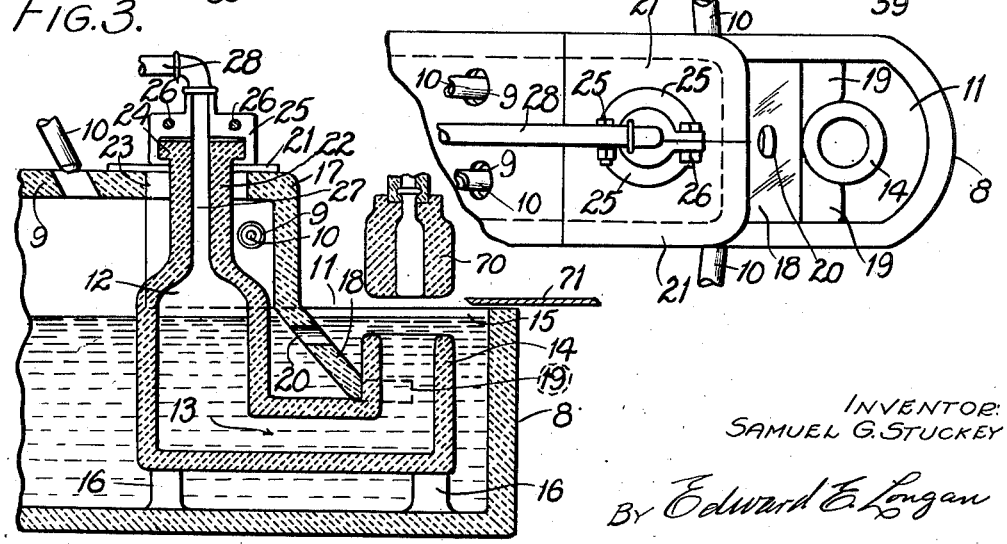
INVENTOR:
SAMUEL G. STUCKEY
By Edward E. Longan
ATTORNEY.

Dec. 8, 1936. S. G. STUCKEY 2,063,565
GLASS FEEDER FOR SUCTION MOLDS
Filed Dec. 6, 1929 2 Sheets-Sheet 2
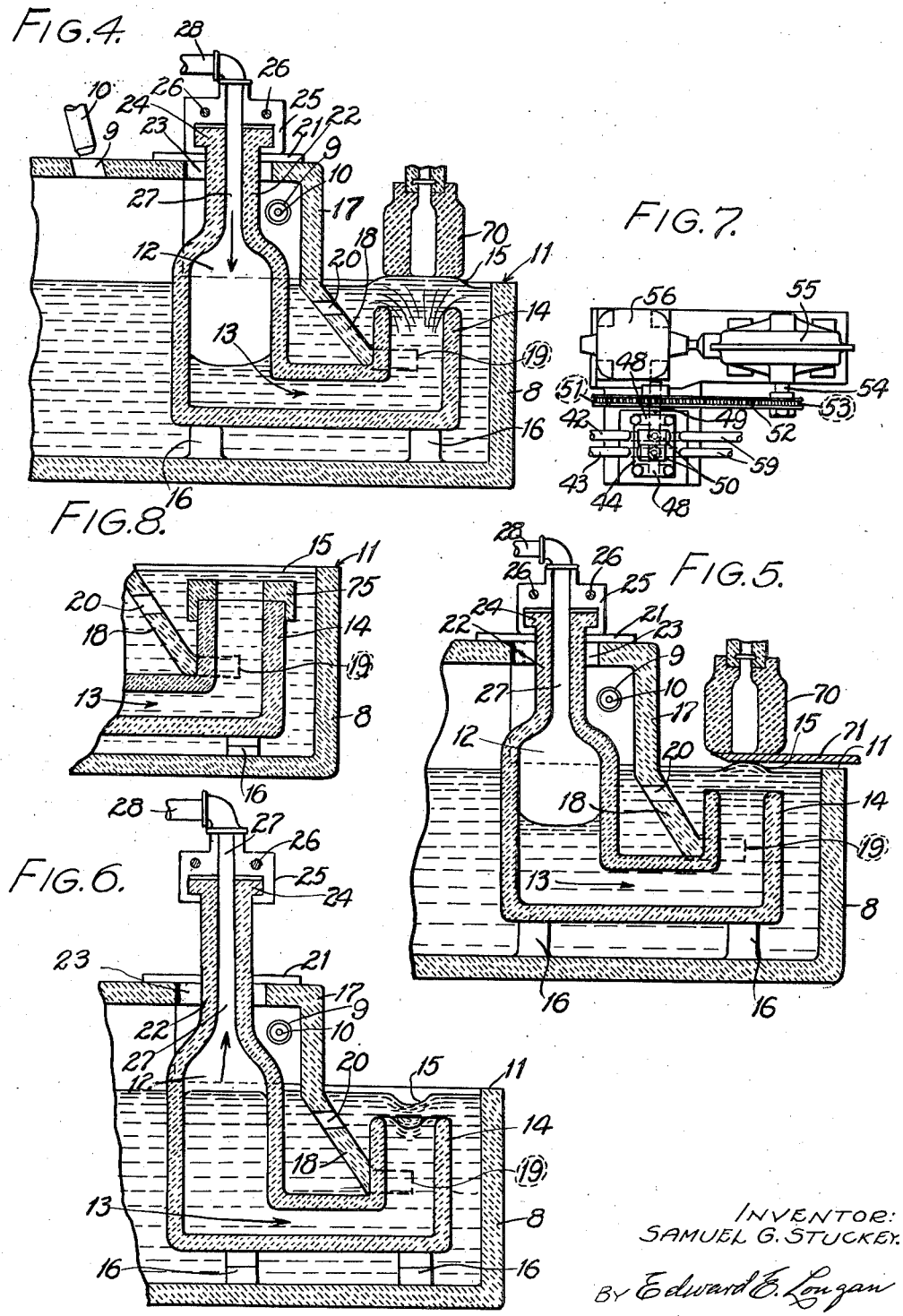
INVENTOR:
SAMUEL G. STUCKEY.
BY Edward E. Longan
ATTORNEY Patented Dec. 8, 1936

2,063,565

UNITED STATES PATENT OFFICE 2,063,565

GLASS FEEDER FOR SUCTION MOLDS

Samuel G. Stuckey, St. Louis, Mo., assignor to Obear-Nester Glass Company, St. Louis, Mo., a corporation of Missouri Application December 6, 1929, Serial No. 412,084

2 Claims. (Cl. 49—56)

My invention relates to improvements in glass feeders for suction molds, and has for its primary object a glass feeder which is directed to the elimination of chill marks left in the glass by contact with a parison mold or the shears or other severing means after the parison mold has been filled.

A further object is to construct a glass feeder in which the hot upper surface of the glass in the well from which a mold charge is drawn by a suction mold will flow over the chill marks left by contact with a suction mold and shears and thereby absorb these chill marks.

Another object is to construct a glass feeder for suction molds, which is so designed that a complete control of the surface of the glass in the well or forehearth at the charging point will be had and more especially that portion of the surface of the glass which has been contacted with by the parison mold during its filling and the stub remaining after the glass has been severed at the bottom of the mold so as to prevent the formation of blisters or laps or folding in the glass.

A further object is to eliminate all moving mechanical parts in the glass and impart what may be termed a tidal movement to only a portion of the glass so that it will be alternately raised up to contact with a mold of the suction type and withdrawn therefrom.

A further object is to construct a glass feeder so that the chill marks produced by the parison mold at the charging point will be reheated without moving the chill marks horizontally from the spot where it has been produced.

A still further object is to construct a glass feeder in which a segregated body of glass located within the glass in the forehearth of the glass furnace has movement imparted thereto so that it will cause a portion of the glass in the forehearth to rise or bulge upwardly and come into contact with the bottom of a suction mold so that the same may be filled from the glass in the forehearth, the bulging or raising being continued a sufficient length of time to permit the mold to be filled without any possibility of air entering during the filling operation.

A still further object is to construct a glass feeder for suction molds in which the glass in the forehearth, after it has been bulged up to contact with a suction type of mold and the same has been filled, is so arranged that the chill marks left by contact with the suction mold and those occasioned by the severing means are drawn beneath the surface of the glass in the forehearth so that the glass therein will flow over the chill marks and eliminate the same.

A still further object is to construct a glass feeder in which the forehearth, which is continuously supplied with molten glass from a glass furnace, is employed and in which means are provided for raising a portion of the surface of the glass in the forehearth to a sufficient height so that it will contact with the lower end of a suction mold, maintain this raising a sufficient length of time to permit the mold to be completely filled, then lower the raised portion of glass, and almost simultaneously therewith pass a severing means below the mold in such a manner as to sever the raised portion from the mold charge, and then draw that portion of the bulged glass, which has become chilled through contact with the mold and the severing means, below the surface of the glass so that fresh hot glass can flow over these chilled portions and reheat the same, this being done without creating any lateral or longitudinal currents in the forehearth.

A still further object is to construct a glass feeder for suction molds in which a constant supply of molten glass is maintained in a forehearth and in which it is unnecessary to have the suction mold provided with means for raising and lowering it but in which means is provided for causing what may be termed a submarine pressure below the surface of the glass in the forehearth so that a portion thereof directly beneath the suction mold will be bulged upwardly into contact with the mold and which means will, after the mold has been filled, draw the remaining portion thereof downward below the surface of the glass in the forehearth so that a portion of the remaining glass therein can flow over the top of the chilled portion and effectively remove any chill marks which may result from the filling and severing.

In accomplishing the foregoing I desire it to be particularly understood that the means, which raises and lowers or bulges the surface of the glass, is not a foreign implement but a portion of the glass itself which has been segregated from the body of glass in the forehearth.

In the drawings:

Fig. 1 is a side elevation of a forehearth with parts in section showing the preferred construction of my device together with one form of operating means which may be employed;

Fig. 2 is a fragmental top plan view of the forward portion of the same;

Fig. 3 is a fragmental section of the forward portion of the forehearth showing the suction mold in position ready to be filled;

Fig. 4 is a similar view showing the suction mold in position as it is being filled and the manner in which the glass in the forehearth is bulged upward;

Fig. 5 is a view similar to view 4 showing the severing means in position immediately after severing the mold charge from the bulged portion;

Fig. 6 is a view similar to Fig. 4, slightly modified, showing another phase of the operation.

Fig. 7 is a top plan view of the timing mechanism employed for causing the tidal movement of the glass in the forehearth; and Fig. 8 is a fragmental sectional view showing one manner in which the upper end of the nozzle can be adjusted to and from the surface of the glass in the forehearth.

In the construction of my device I employ a forehearth or container 8, which is built on to any style of glass melting furnace, preferably that which is known to the trade as a continuous furnace as by that type of furnace I am enabled to maintain a constant level of glass within the forehearth or boot than by an intermittent feed to the forehearth. The forehearth is provided with a plurality of openings 9 which are formed both in the top and side of the rear portion, and through these openings jets of flames from burners 10 enter the forehearth above the glass level for the purpose of bringing the glass contained therein to its proper temperature. The forward portion of the forehearth is open at its top as indicated by the numeral 11 and in this open portion is inserted the member by which the tidal flow or bulging of the surface of the glass is obtained. This member is formed preferably of refractory material or clay and consists of a bottle shaped chamber 12. Projecting from one side of this chamber and toward the front of the forehearth 8 is a passage 13. This passage is formed adjacent the bottom end of the bottle shaped chamber 12. The passage terminates in an upwardly projecting nozzle 14, the orifice of this nozzle, however, being located at a predetermined distance below the surface 15 of the glass within the forehearth or well 8. The feeding member is supported on projections or lugs 16, which may be either formed integral with the bottom of the forehearth or they may be loosely placed therein.

After the feeding member has been placed in position a hood 17 is so located as to enclose the bottle shaped member and, after entering the glass, has a portion 18, which inclines downwardly and forwardly.

This portion 18 has a horizontal projection 19. The purpose of this is to cause the majority of the glass passing toward the front of the boot to move downward and forward so that the heated glass, which will naturally be on the top as it comes from the furnace, will be forced downward and mix with the colder glass near the bottom of the forehearth and thus have a certain amount of puddling or mixing action.

The forwardly and downwardly inclined portion 18 may also be provided, if found desirable or necessary, with an opening 20 through which glass can flow. This will permit a restricted amount of glass to flow into the pool formed by the side walls and front wall of the forehearth and the inclined portion 18 of the cap 17. After the cap 17 has been placed in position I find it desirable to place a pair of plates 21 on top of the cap. These plates have an opening in each half which closely surrounds the neck 22 of the bottle shaped member 12. I have found these plates desirable because in order to place the cap 17 in position it is necessary to slot the same as indicated by the numeral 23 in order that the neck of the bottle shaped member may pass therethrough.

The neck 22 of the bottle shaped member is provided with a flange 24, which is surrounded by a split clamp 25, this clamp being secured around the flange and the upper portion of the neck by means of bolts 26. The neck of the bottle-shaped member is provided with a restricted passage 27, which communicates with a conduit 28. The conduit 28 terminates in the upper end of a cylinder 29 in which a piston 30 is mounted for reciprocation.

The piston 30 is provided with a valve 31, which is designed to be opened when the piston arrives at its lower position so that atmospheric conditions will be restored within the cylinder 29, the conduit 28, and that portion of the interior of the bottle shaped member 12, which is above the level of the glass.

The piston 30 has attached thereto a piston rod 32, the opposite end of which is attached to a piston 33 mounted in a power cylinder 34. The power cylinder 34 is provided with a port 35 to which is attached a conduit 36. This conduit 36 has therein a throttling check valve 37. The conduit 36 is also attached to one end of a valve housing 38 in which a slide valve 39 is mounted. The slide valve 39 has attached thereto a piston rod 40 which in turn is attached to a piston mounted in an air cylinder 41.

The air cylinder 41 has attached thereto air conduits 42 and 43 by means of which the piston located in the cylinder can be reciprocated backward and forward. Air is admitted to the conduits 42 and 43 by means of valves, which are located in valve housings 44. The valves 45 in the housing are preferably of the mushroom type and are operated by means of rocker arms 46, which are carried on a shaft 47 mounted in brackets or bearings 48. The brackets or bearings 48 also carry a shaft 49 on which cams 50 are fixed. The shaft 49 is driven by means of a sprocket wheel 51, which is driven by a chain 52, this chain in turn being driven by a sprocket wheel 53 mounted on a shaft 54.

The shaft 54 is driven by a worm drive located in the housing 55, this worm drive being in turn placed in operation by means of an electric motor 56, the electric motor is preferably of the variable speed type so that various speeds of operation can be obtained without the necessity of changing sprocket wheels.

The valve housings 44 are each provided with a by-pass 57, which allows air to bleed back from the cylinder 41 when the piston moves in the opposite direction. Air is supplied to the chamber 58 in the valve housing by means of an air pipe 59, which is attached to any suitable source of air pressure, preferably a storage tank as by such connection pulsations usually occurring with air compressors are eliminated.

The valve housing 38 has attached thereto a conduit 60, which also leads to a suitable source of constant air supply and with an exhaust port 61.

Located in the lower end of the power cylinder 34 is an adjustable head 62, which is carried on a hollow screw 63. This screw may be raised and lowered by means of an intermittently screw threaded hand wheel 64 and by raising and lowering this screw the length of stroke of the piston 33 is controlled. This also controls the length of stroke of the piston 30. Attached to the lower end of the hollow screw 53 is a conduit 65, which has a throttling check valve 66 incorporated therein. This conduit 65 is also connected to the valve housing 38. It is essential to note in connection with my device that the screw 63 be so arranged that it will not rotate when the hand wheel 64 is rotated but will merely move up and down. This rotation preventing means is not shown as it is well known to mechanics, and various types of rotation preventing devices, as screws, pins or keys, can be employed for this purpose.

The lower end of the hollow screw 63 also carries a bracket 67 which in turn carries a rod 68. The upper end of the rod 68 is designed to be contacted with by the end of the valve stem 69, which carries the valve 31. In this way it will be seen that the valve 31 will be opened when the piston 30 reaches the last portion of one of its strokes and as the stroke of the cylinder 34 is decreased, the rod 68 is also raised so that the opening of the valve at approximately the extreme end of the stroke is positively regulated.

70 represents the suction mold and 71 a severing means. This severing means may be a single blade which co-acts with the lower end of the mold as illustrated in Fig. 5.

While I have shown my device as having the valves, which place the power cylinder in operation, driven by means of a worm gear operated by an electric motor, still it is obvious that other means may be employed for driving the cams 50 than that disclosed in the drawings, and again other timing mechanism than that shown may be employed without departing from the spirit of my invention.

The operation of my device is as follows: After the various parts have been assembled and properly connected up, the glass furnace is charged with the various ingredients and the heating commenced as the various components of the glass melt and fuse together forming the glass. This molten glass flows forward in the furnace and into the forehearth and rises therein, eventually flowing over the top of the nozzle 14, then down into the passage 13 and into the bottle shaped member 12.

After the forehearth becomes filled to its uppermost limit the glass within the bottle shaped chamber 12 will be on the same level as the glass in the forehearth with the passage 13 and the nozzle 14 submerged in the glass. The device is then ready for operation, it being assumed that the piston 30 as well as the piston 33 are at their lowest position. The hand wheel 64 is then manipulated to provide the proper length of stroke for these pistons after which the air from the air supply, not shown, is turned on so that air can pass through the conduits 59 and 60.

The device is then ready for operation and the timing mechanism is started. This causes the shaft 49 together with the cams 50 to rotate. At a predetermined time one of the cam lobes comes in contact with a rocker arm opening up the valve 45 so that air can pass from the valve housing 44 through the conduit 42 driving the piston in the air cylinder 41 forward so that the slide valve will assume the position shown in Fig. 1. This permits air to pass from the conduit 60 into the valve housing 38 through the conduit 65 and throttling check valve 66, thence through the hollow screw 63 to the underside of the piston 33 driving it upward. Simultaneously with this upward movement the piston 30 is also driven upward permitting the valve to seat and close off the passage formed through the piston 30 thus compressing air within the cylinder 29.

This compressed air passes through the conduit 23, down through the neck of the bottle shaped chamber and on to the surface of the glass within this chamber, driving this glass downward. This downward movement of the glass within the bottle shaped chamber 12 causes the glass to be forced through the passage 13 and upward through the nozzle 14. The upward movement of the glass in the nozzle 14 causes the surface 15 of the glass in the forehearth 8 to bulge upward as illustrated in Fig. 4. Of course it is understood that before this bulging takes place, the suction mold 70 has been moved into operative position. The air pressure causes sufficient bulging of the glass so as to bring it into contact with the lower end of the suction mold. As soon as this contact is made suction is applied to the mold drawing molten glass therein but the air pressure within the bottle shaped chamber 12 is continued until the mold is completely filled. This is necessary because if a constant contact between the glass and the lower end of the suction mold were not obtained, there would be a possibility of drawing air to the parison, which would cause seeds and blisters in the finished article.

Just at the time that the mold is filled, the remaining cam 50 operates the remaining rocker arm opening a valve 45, which admits air from the valve housing 44 to the conduit 43. This drives the piston in the air cylinder 41 in the opposite direction moving the slide valve 39 to the right thus permitting air from the conduit 60 to pass through the conduit 36 into the upper part of the cylinder 34 and reverse the action of the piston 33 and consequently the piston 30.

The air, which is beneath the piston 33, then exhausts back through the hollow screw 63, the conduit 65 and out through the port 61 in the valve housing 38. The downward movement of the piston 30 then draws out air from the bottle shaped chamber 12 creating a retrograde movement of the glass in the passage 13 and nozzle 14. This commences to draw down the bulging previously formed by the pressure, and as this bulging commences to move down the shear blade 71 comes into action and severs the parison from the glass which remains below the mold. This retrograde movement of the glass is continued and causes a depression to be formed in the surface of the glass within the forehearth immediately above the nozzle so that fresh glass from the forehearth can flow over that portion of the glass which has been chilled by contact with the mold and also by the shears so that these chill marks will be reheated, and absorbed in the fresh glass.

From the foregoing it will be seen that I create what may be termed a tidal condition immediately above the nozzle 14, there being a regular ebb and flow. The suction stroke also restores the level of the glass within the chamber 12. This completes one cycle of the operation, the succeeding cycles being the same.

It is essential, however, in the operation of my device, that the quickness at which the piston 30 moves in either direction be carefully regulated because if the movement is too fast, there is danger of blowing the glass upward and break the surface of the glass in the forehearth. In other words, there would be a geyser action obtained whereas if the suction is applied too rapidly there is danger of forming the depression too rapidly causing the molten glass to flow over this depression and trap air bubbles.

Then, again, if the pressure is applied too slow, it will be impossible to obtain the necessary bulging action on the surface of the glass in the forehearth above the nozzle so that it will not meet and contact with the suction mold.

It is also necessary that the capacity, that is the glass capacity of the bottle shaped chamber 12, be such that even with the full stroke of the piston 30, the passage 13 will be always below the surface level of the glass in the chamber because if the surface level of the glass in the chamber 12 were lowered below the top of the passage 13, air would enter and become trapped and gradually find its way up through the nozzle forming seedy, blistery glass.

It will, therefore, be seen that it is essential that this capacity be regulated as well as the quickness at which the pressure and vacuum conditions within the chamber 12 are obtained.

I have also found it desirable to adjust the upper end or opening of the nozzle 14 to and from the surface of the glass in the forehearth. This may be done as illustrated in Fig. 8 by placing a cap or collar, or a series of caps or collars on the upper end of the nozzle thereby extending the same thus controlling its outlet or rather the distance of the outlet below the surface of the glass in the forehearth.

I may also provide for this adjustment by making the supports or lugs 16 in several sections so that portions thereof can be removed or added, and the entire bottle-shaped member, nozzle and the passage 13 elevated or lowered. When this form of structure is used, it will be necessary to lengthen the neck 22 of the bottle-shaped member as illustrated in Fig. 6 so that in the event the nozzle is to be lowered, the same can be readily accomplished.

By either of these two methods, the distance below the surface of the glass in the forehearth, to which the outlet of the nozzle 14 is submerged, can be regulated and thereby the action of the pressure and vacuum and the consequent bulging of the glass immediately above the nozzle regulated to any desired degree. It will be understood, of course, that the higher the mouth of the nozzle is elevated, the more action will be had on the surface of the glass in the forehearth and the more glass contained in the bottle-shaped member, nozzle and passage will be drawn into the mold. Therefore, not only will the air pressure causing the bulging or tidal movement of the surface of the glass in the forehearth be controlled by the air pressure imparted but also it will depend considerably upon the distance or rather depth of the nozzle, or rather its mouth below the surface of the glass, but at all events the nozzle is never elevated to such a position that it will protrude or project beyond the surface of the glass in the forehearth for contact with the parison or suction mold, my device depending entirely upon the bulging of the surface of the glass in the forehearth or contact with the suction mold and no physical contact whatsoever between the suction mold and the nozzle.

It is also necessary that during the filling of the suction mold that the bulging be maintained until the time is ready for severing because where glassware containing quite a volume of glass, that is heavy ware, is to be made, I have found it desirable to maintain the suction in the suction mold for a certain length of time so that the enamel, which forms on the outside of the parison by reason of its contact with the suction mold, can penetrate a certain distance or acquire a certain thickness but where thin articles are to be manufactured, that is glass articles which have a relatively small amount of glass in their sides or walls, a deep penetration of chill or thick enamel is not desirable because when such articles are then finished I have noticed that the outer surface becomes disrupted, that is full of minute cracks which detract from the article. Therefore, it is essential that the length of time in which the parison is retained in the suction mold be varied according to the kind of ware produced and that the contact between the glass from the forehearth or container with the bottom of the mold be maintained during this entire suction period. In other words, I have found it necessary to vary the time of contact of the bulged glass with the bottom of the mold directly as the suction in the mold is maintained.

The foregoing is especially true where heavy necks are formed on bottles or similar containers in the parison mold which require a longer time for setting than where thin necks or beads are desired. Again, if thin ware is to be manufactured, the parison is relatively small in diameter in proportion to the finished article, and if glass is maintained in the parison too long, it will acquire such a chill that it can not be expanded sufficiently to fill the blow mold. Therefore, it is essential that the parison be taken out of the suction mold as quickly as possible and before sufficient chill sets in to cause the enamel to set sufficiently to crack when the expansion takes place in making the completed article.

Having fully described my invention, what I claim is:—

1. A glass feeder for suction molds comprising a container having an opening at its top and adapted to hold a supply of molten glass at a constant level, an upwardly directed tube having its upper end open and terminating in the body of glass in the container and below the level thereof, means for creating intermittent currents of glass through the tube sufficient to materially disturb the level of glass in the container immediately above the tube, and removable annular extension members inserted on the end of the tube and wholly immersed in the glass.

2. In a device of the kind described, a container adapted to contain a supply of molten glass up to a determined surface level, an inner shell terminating in an outlet below the surface of said glass so as to receive glass from said container, means to cause the glass within the shell to surge therefrom, a wall in said container and extending from above the surface of the glass to a point below said surface, whereby said container is divided into an inner and an outer section, and the top glass from the inner section must flow downwardly to mix with the bottom glass in passing around said wall from the inner to the outer section, the shell outlet being in the outer section, and said wall having a passage therethrough near the top surface of the glass through which a restricted portion of said top glass may flow from the inner to the outer section.

SAMUEL G. STUCKEY.